(12) United States Patent
Baker et al.

(10) Patent No.: US 6,382,229 B1
(45) Date of Patent: May 7, 2002

(54) VALVE ASSEMBLY AND SEAL THEREFOR

(75) Inventors: Scott C. Baker, Stevenson Ranch; Oscar Romero, Granada Hills; Mark Bloom, Ventura, all of CA (US)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/732,831

(22) Filed: Dec. 8, 2000

(51) Int. Cl.⁷ ................................. F16K 11/02
(52) U.S. Cl. .................. 137/15.18; 137/270; 137/454.6
(58) Field of Search ............................. 137/270, 454.5, 137/454.6, 625.31, 15.18, 454.2

(56) References Cited

U.S. PATENT DOCUMENTS

| | | |
|---|---|---|
| 3,645,493 A | 2/1972 | Manoogian et al. |
| 3,698,418 A | 10/1972 | Schmitt |
| 3,780,758 A | 12/1973 | DeVries |
| 3,831,621 A | 8/1974 | Anthony et al. |
| 4,331,176 A | 5/1982 | Parkison |
| 4,651,770 A | 3/1987 | Denham et al. |
| 4,821,765 A | 4/1989 | Iqbal et al. |
| 4,823,832 A | 4/1989 | Rodstein |
| 4,924,903 A | 5/1990 | Orlandi |
| 5,010,917 A | 4/1991 | Iqbal |
| 5,234,020 A | 8/1993 | Orlandi |
| 5,398,717 A | 3/1995 | Goncze |
| 5,692,536 A | 12/1997 | Takarz |
| 5,732,734 A | 3/1998 | Buccicone |
| 5,832,952 A * | 11/1998 | Cook et al. .................. 137/270 |
| 5,918,626 A | 7/1999 | Strong et al. |
| 6,016,830 A | 1/2000 | Niakan et al. |
| 6,062,251 A * | 5/2000 | Pitsch .......................... 137/270 |

* cited by examiner

Primary Examiner—Kevin Lee
(74) Attorney, Agent, or Firm—Richard J. Veltman; John D. Del Ponti

(57) ABSTRACT

A valve assembly comprises a valve stem, an annular bonnet configured to receive the valve stem, a valve disk coupled to one end of the valve stem, a seal, and an insert. The seal is disposed adjacent the valve disk and has a top surface and a bottom surface. The top surface includes a first pair of sealing ridges extending upwardly therefrom and the bottom surface includes a second pair of sealing ridges extending downwardly therefrom. The insert includes a recess configured to receive the seal that performs a sealing function and a biasing function. The valve assembly can easily be configured to open in either a clockwise or counterclockwise direction without resort to adapters or other additional pieces by rotating the bonnet/valve stem sub-assembly 90° relative to the insert.

36 Claims, 9 Drawing Sheets

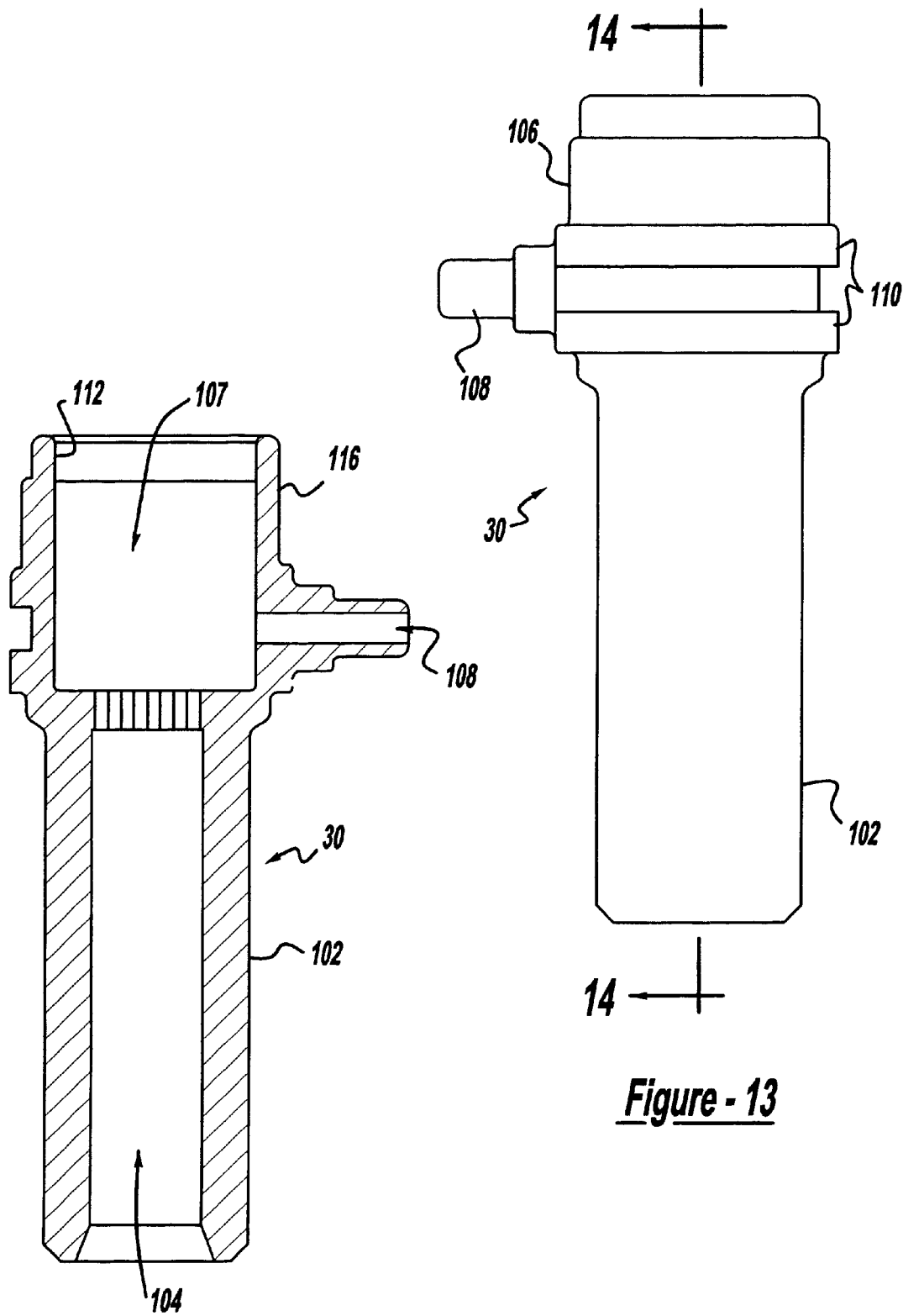

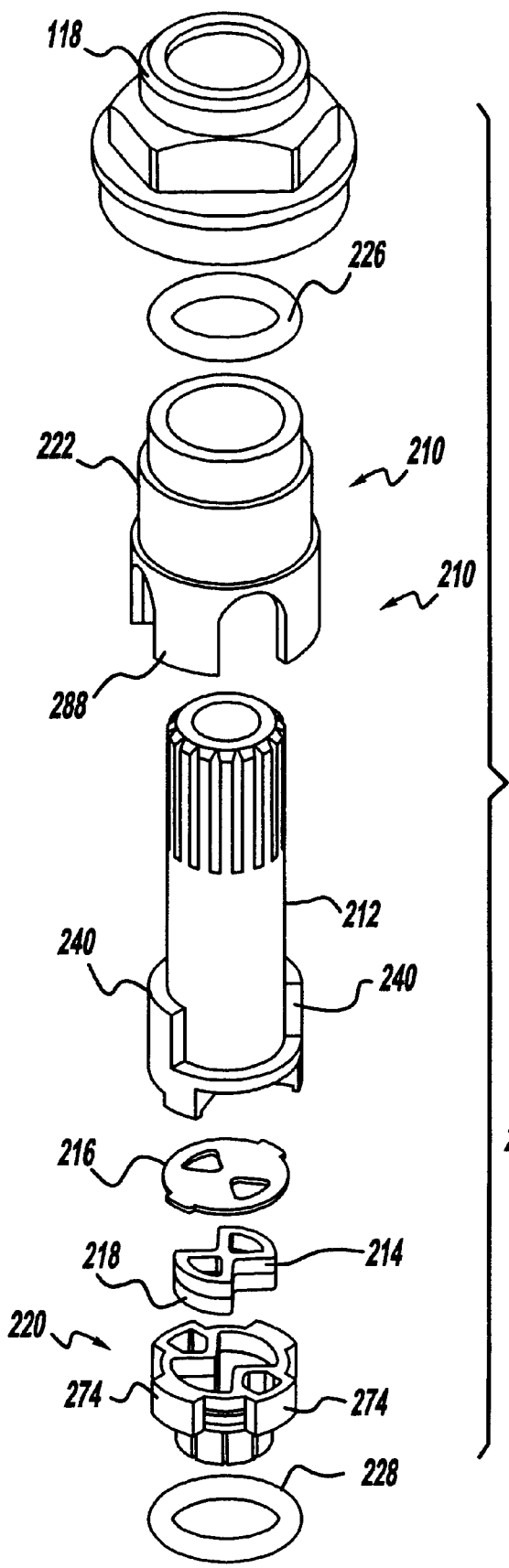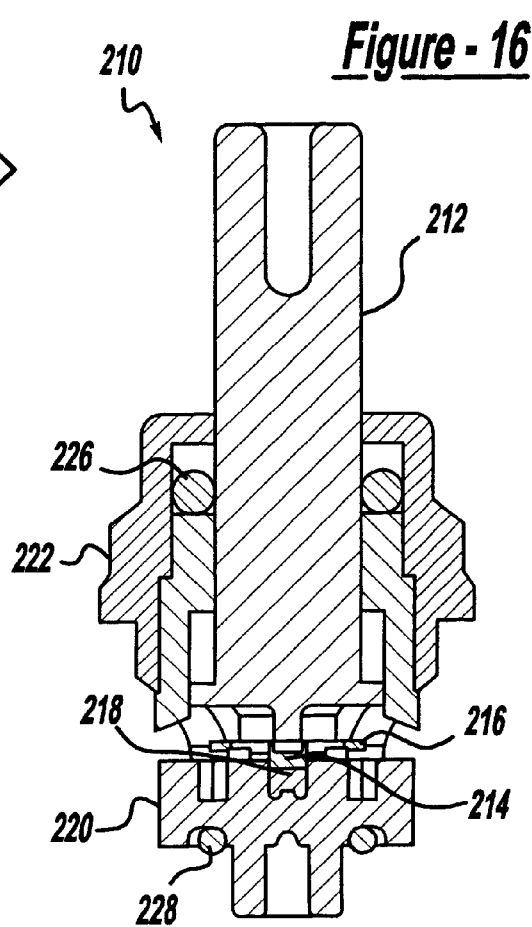
Figure - 15
Figure - 16

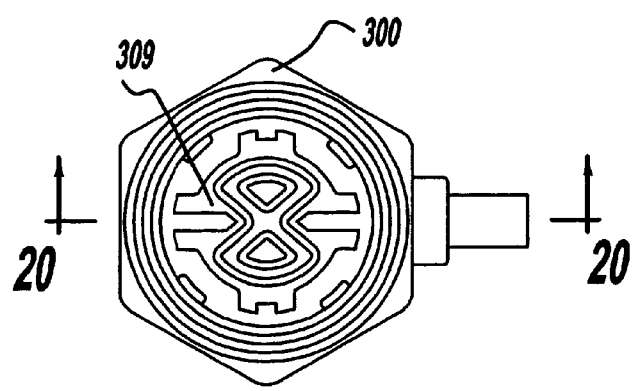
*Figure - 19*
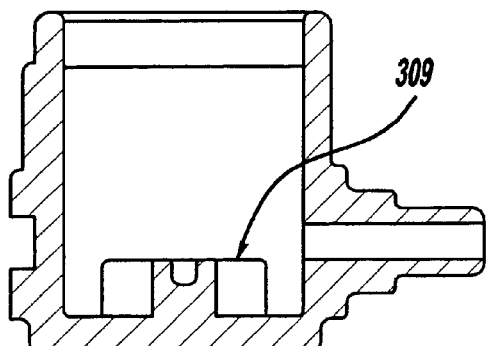
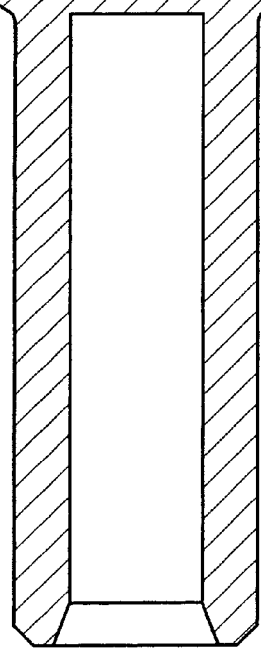
*Figure - 20*
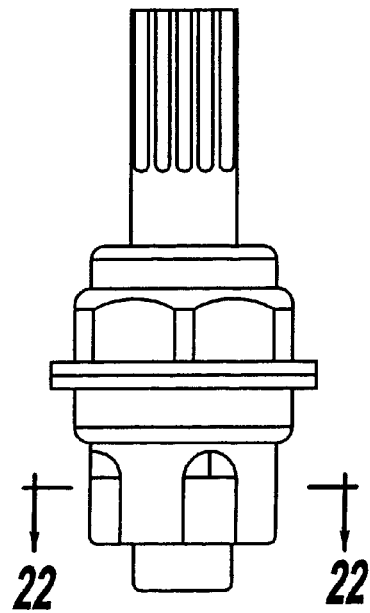
*Figure - 21*

VALVE ASSEMBLY AND SEAL THEREFOR

The present invention relates generally to valves and particularly to water valves for use with faucets. More particularly, the invention relates to non-rising valves with valve disks that are rotated 90° to open/close the valve.

BACKGROUND AND SUMMARY OF THE INVENTION

Conventional valves are rising or non-rising. In conventional non-rising valves, a disk rotates relative to a seal that is urged into contact with the disk by a spring. Unfortunately, the use of a spring requires extra inventory and an additional step during the assembly process. A valve assembly that eliminates the spring would provide a material and labor advantage to a manufacturer.

Another disadvantage of conventional valves is the complexity of changing the direction of movement to operate the valve. For example, in one installation, it is desirable for the cold water valve and the hot water valve to turn in opposite directions to open. In order to use a single valve design for both hot and cold water, conventional valves include one adapter for a clockwise opening action and a different adapter for a counterclockwise opening action. The adapters are installed in the field by inserting them into the end bodies so that stops formed on the adapters limit movement of the valve stems to a particular arc of motion relative to the end body. Unfortunately, the adapters represent additional manufacturing cost, additional labor during valve installation, additional inventory cost, and an opportunity to improperly install the valve. A valve that could be easily and quickly converted from clockwise to counterclockwise operation without requiring additional parts, such as adapters, would be a welcome improvement.

According to the present invention, a valve assembly comprises a valve stem, an annular bonnet configured to receive the valve stem, a valve disk coupled to one end of the valve stem, a seal, and an insert. The seal is disposed adjacent the valve disk and has a top surface and a bottom surface. The top surface includes a first pair of sealing ridges extending upwardly therefrom and the bottom surface includes a second pair of sealing ridges extending downwardly therefrom. The insert includes a recess configured to receive the seal.

According to one aspect of the invention, the seal is bow tie shaped and defines a first pair of orifices for the passage of fluid therethrough. The valve assembly further includes a second valve disk disposed adjacent the first valve disk wherein the seal provides a sealing function and a biasing function.

According to another aspect of the invention, the insert includes a second pair of orifices, and the valve disk includes a third pair of orifices. The first pair of orifices aligns with the second and third pairs of orifices for the passage of fluid through the valve assembly. The third pair of orifices is aligned with the first and second pairs of orifices when the valve assembly is in an open condition for the passage of fluid therethrough. The third pair of orifices is non-aligned with the first and second pairs of orifices when the valve assembly is in a closed condition to prevent the passage of fluid therethrough.

According to another aspect of the invention, the valve assembly further includes an end body having an inlet and an outlet, with the valve insert being disposed in the end body between the inlet and the outlet. In one embodiment of the invention, the valve insert is integrally formed with the end body.

According to another aspect of the invention, the valve assembly further includes means for changing the operation between a clockwise and a counterclockwise motion. The bonnet includes four legs that depend downwardly therefrom and the insert includes four projections. The legs are disposed between the projections in a first configuration wherein the valve opens with a clockwise movement. If the bonnet is disengaged from the projections, rotated 90° in either direction relative to the insert, and reengaged with the projections, the valve opens with a counterclockwise movement. Thus, any valve manufactured with this feature can be used for knobs or levers without regard to handing. In addition, this feature eliminates the need for the adapters used in conventional valves.

Other features and advantages of the invention will become apparent from the following portion of this specification and from the accompanying drawings, which illustrate a presently preferred embodiment incorporating the principles of the invention.

BRIEF DESCRIPTION OF THE DRAWINGS

FIG. 13 is a side view of an end body for receiving the valve assembly of FIG. 1.

FIG. 14 is a section view taken along line 14—14 in FIG. 13.

FIG. 15 is an exploded perspective view of another embodiment of the valve assembly of the present invention.

FIG. 16 is a section view taken through the valve assembly of FIG. 15.

FIG. 19 is a top view of an end body for use with the valve assembly of FIG. 18.

FIG. 20 is a section view taken along line 20—20 of FIG. 19.

FIG. 21 is a view of the assembled valve of FIG. 15.

DETAILED DESCRIPTION OF THE DRAWINGS

Figure 1:
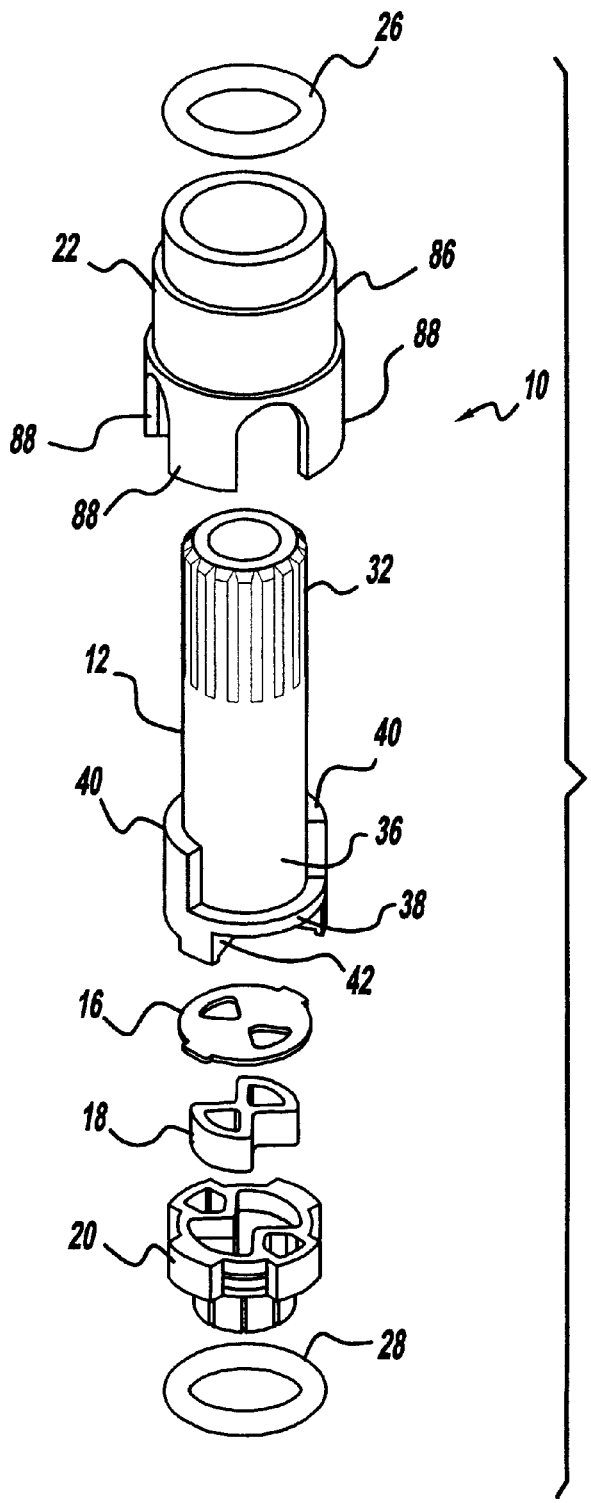
FIG. 1 is an exploded perspective view of one embodiment of a valve assembly according to the present invention.
Figure 2:
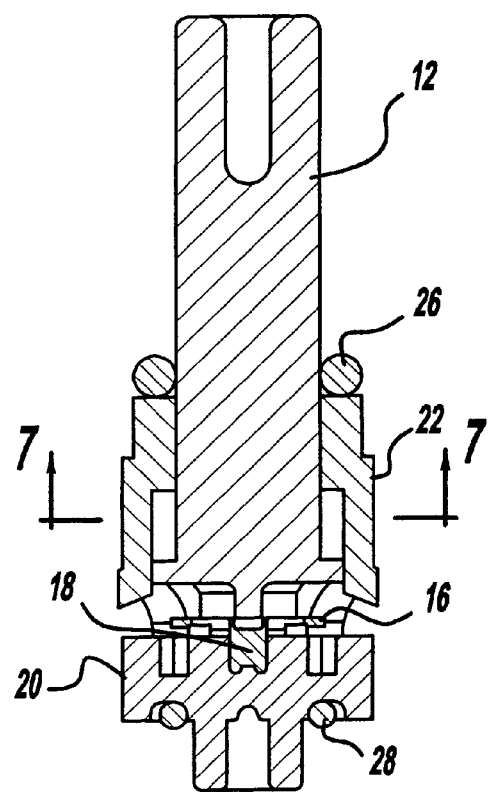
FIG. 2 is a section view taken along the longitudinal axis of the valve assembly of FIG. 1.
Figure 3:
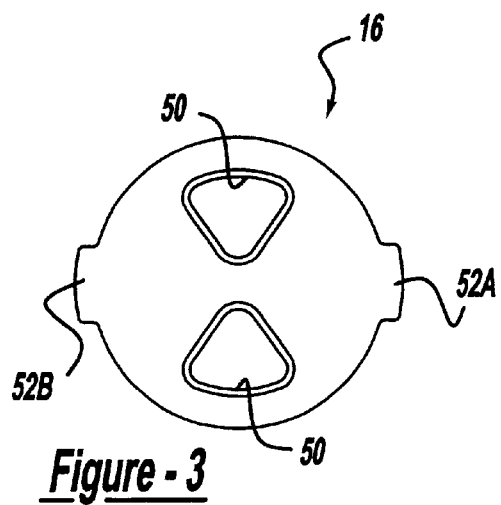
FIG. 3 is a plan view of a valve disk for use in the valve assembly of FIG. 1.

A valve assembly 10 according to the present invention is illustrated in FIGS. 1–2. The valve assembly 10 includes a stem 12, a valve disk 16, a seal 18, an insert 20, a bonnet 22, and a pair of o-rings 26, 28. The valve assembly 10 is configured to be inserted into the outlet of an end body 30, illustrated in FIGS. 13–14.

Figure 4:
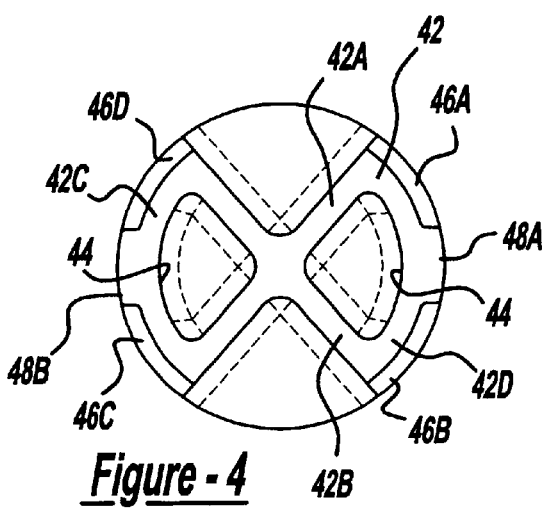
FIG. 4 is a bottom view of the stem of the valve assembly illustrated in FIG. 1.

The stem 12 includes a splined first end 32 and a second end 36. The second end 36 includes a lip 38 that extends radially beyond the circumference of the stem 12. A pair of stopping members 40 extends axially from the lip 38 toward the first end 32 and are disposed diametrically on the stem 12. A bow tie shaped projection 42 extends downwardly from the second end 36. The projection 42 includes a pair of intersecting orthogonal walls 42A, 42B and a pair of arcuate walls 42C, 42D that extend between the walls 42A and 42B, as illustrated in FIGS. 1 and 4. The walls 42A–D cooperate to define a pair of generally triangular recesses 44. A plurality of skirt segments 46A, 46B, 46C, 46D extend downwardly from the arcuate walls 42B, 42C. The skirt segments 46A, 46B are disposed to form a first gap 48A and skirt segments 46C, 46D are disposed to form a second gap 48B. Preferably, the gaps 48A, 48B are not the same size and are not located on a common diameter of the stem 12 to facilitate proper alignment of the valve disk 16.

The valve disk 16 is a circular disk having a pair of generally triangular openings 50 and a pair of tabs 52A, 52B extending radially from the edge of the disk 16. The disk 16 is sized and configured to allow the disk 16 to fit snuggly against the skirt segments 46A–D. The tabs 52A, 52B fit in the first and second gaps 48A, 48B, respectively, to provide for proper alignment of the disk 16 on the stem 98. When the disk 16 is properly installed on the stem, the disk triangular openings 50 are disposed outside the area enclosed by the walls 42A–D and provide a flow path for fluid.

Figure 11:
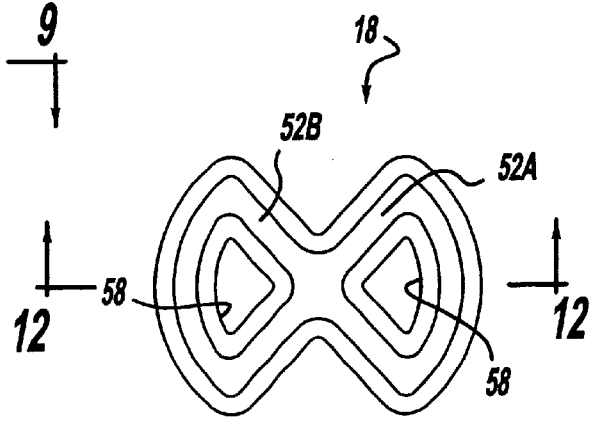
FIG. 11 is a plan view of a bow-tie seal for use in the valve assembly of FIG. 1.
Figure 12:
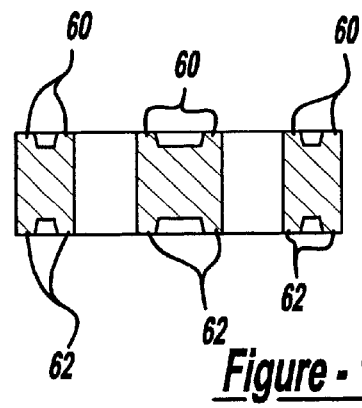
FIG. 12 is a section view taken along line 12—12 in FIG. 11.

The seal 18, illustrated in FIGS. 11–12, is bow tie shaped and includes a pair of intersecting orthogonal walls 54A, 54B and a pair of arcuate walls 54C, 54D that cooperate with the orthogonal walls 54A, 54B to define a pair of triangular orifices 58. As illustrated in FIG. 12, each wall includes a pair of sealing ridges 60 extending upwardly from the top surface and a pair of sealing ridges 62 extending downwardly from the bottom surface. Advantageously, the seal 18 provides a biasing function and a sealing function, thereby eliminating the need for a conventional biasing spring.

Figure 8:
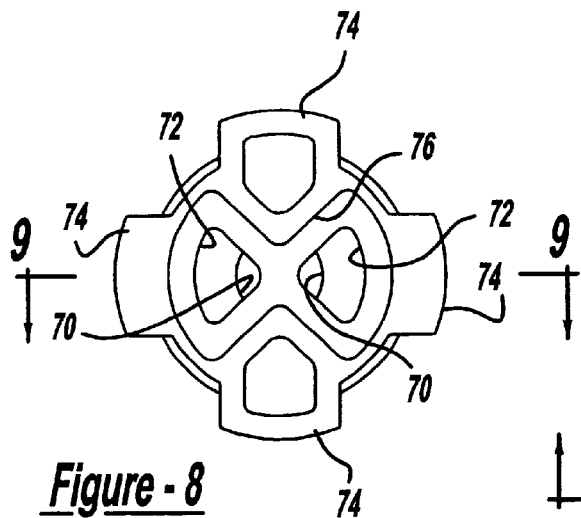
FIG. 8 is a plan view of the insert of the valve assembly illustrated in FIG. 1.
Figure 9:
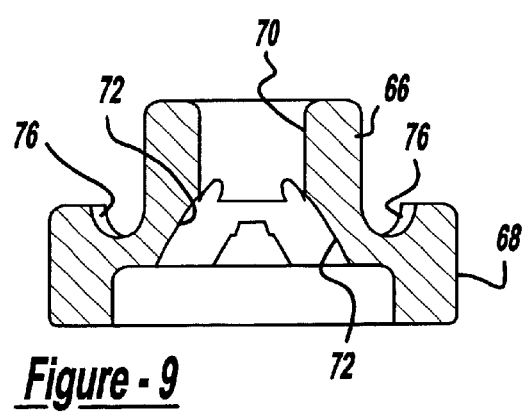
FIG. 9 is a section view taken along line 9—9 in FIG. 8.
Figure 10:
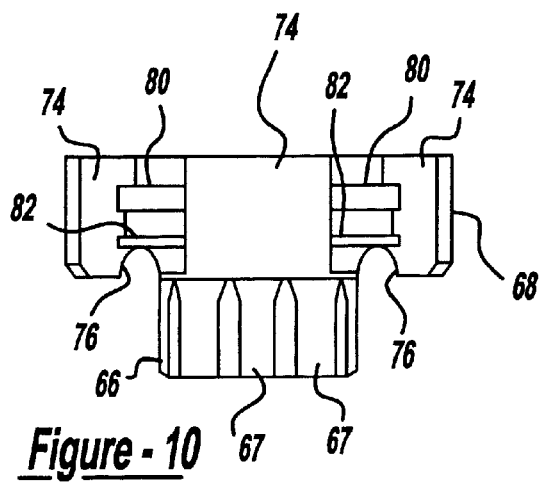
FIG. 10 is a side view of the insert of FIG. 8.
Figure 17:
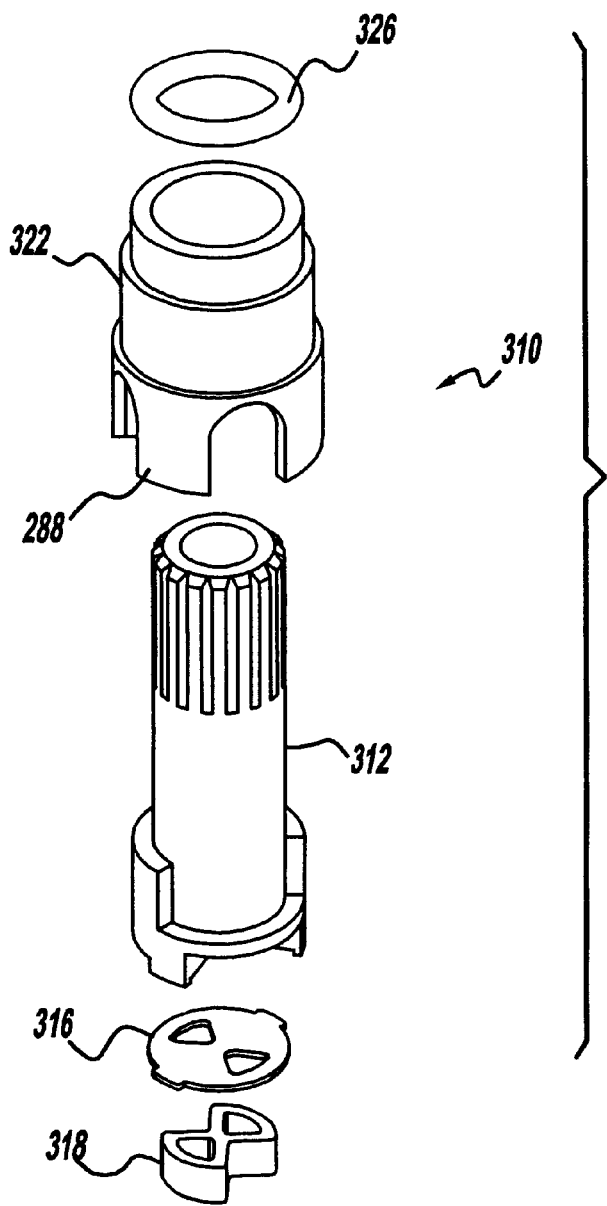
FIG. 17 is an exploded perspective view of yet another embodiment of the valve assembly of the present invention.

The insert 20, illustrated in FIGS. 8–10, includes a bottom portion 66 configured with splines 67 that engage splines 31 formed in the outlet of the end body 30 (FIG. 14) and an upper portion 68. The bottom portion 66 includes an inlet 70 and the upper portion 68 includes a pair of outlet orifices 72 that communicate with the inlet 70. The outlet orifices 72 are disposed in a bow tie shaped recess 76 that is configured to snuggly receive the seal 18, with the seal orifices 58 being aligned with the outlet orifices 72. The upper portion 68 includes four projections 74 that extend radially beyond the lower portion 66. The projections 74 cooperate with the upper portion to define an annular groove 76 for receiving the o-ring 28. A pair of flanges 80, 82 extend outwardly from the upper portion 68 between the projections 74 for engaging the bonnet 22.

Figure 5:
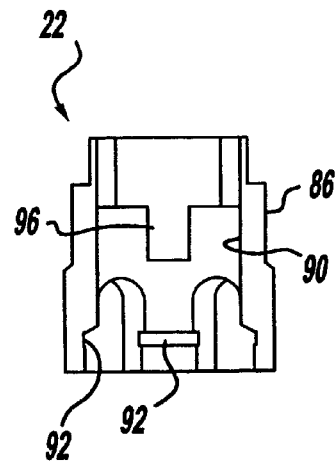
FIG. 5 is a section view through the bonnet of the valve assembly illustrated in FIG. 1.
Figure 6:
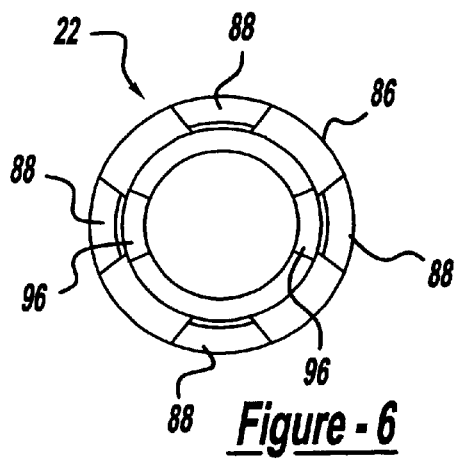
FIG. 6 is a bottom view of a bonnet for use in the valve assembly of FIG. 1.
Figure 7:
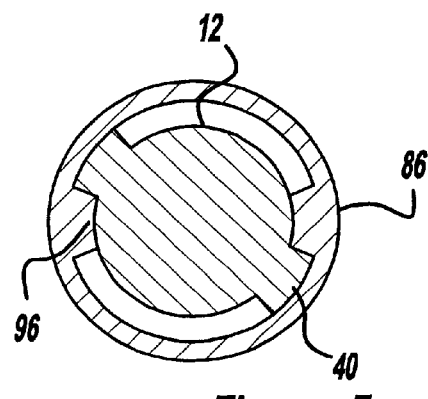
FIG. 7 is a section view taken along line 7—7 of FIG. 2

The bonnet 22, illustrated in FIGS. 1 and 5–6, is an annular member that includes a body portion 86 and four legs 88, equally spaced around the perimeter and extending longitudinally from the bottom of the body portion 86. The inner surface 90 of each leg 88 includes a groove 92 for engaging the flange 80. The flange 82 abuts the inner surface 90 below the groove 92 to provide stability. A pair of stopping members 96, diametrically disposed on the inner surface 90 of the body portion 86, extend inwardly from the inner surface 90. In operation, the stopping members 96 cooperate with the stopping members 40 on the stem 12 to restrict the stem to 90° of rotation, as illustrated in FIG. 7.

An end body 30 for use with the valve assembly 10 is illustrated in FIGS. 13–14. The end body 30 includes upper and lower portions. The tubular lower portion 102 includes external threads and a central passage 104 configured to receive the bottom portion 66 of the insert 20. The upper portion 106 includes a central passage 107 configured to receive the upper portion 68 of the insert 20 and an outlet 108. Upper and lower hexagonal flanges 110 extend radially outwardly from the perimeter of the upper portion 106. The upper portion 106 also includes internal threads 112 and external threads 116. The internal threads 112 engage a bonnet hold down nut 118 (FIG. 15). The external threads 116 engage a valve assembly hold down nut (not shown) to retain the end body 30 in a faucet body or sink deck.

An alternative valve assembly 210 is illustrated in FIGS. 15–16 and 21. The valve assembly 210 includes a stem 212 with stops 240, a valve disk 216, a seal 218, an insert 220 with projections 274, a bonnet 222 with legs 288 and stops 296 (FIG. 22), and o-rings 226, 228, all of which are substantially similar to their respective counterparts in the valve assembly 10. In addition, the valve assembly 210 includes a second valve disk 214 that includes a plan form that matches the plan form of the seal 218. The seal 218 differs from seal 18 in height, so that the combination of seal 218 and second valve disk 214 is substantially equal to the height of seal 18.

According to one aspect of the invention, the disks 16 and 214 are ceramic or ceramic coated metal or plastic disks, and the ceramic-on-ceramic interface provides a sealing function. In addition, the seal 218 provides a biasing function to retain the disks 16, 214 in contact and a sealing function between the insert 220 and the disk 214.

Another alternative valve assembly 310 includes a stem 312, a valve disk 316, a seal 318, a bonnet 322 and an o-ring seal 326. The valve assembly 310 does not include an insert. Instead, an insert 309 that is similar to insert 20 is integrally formed in the end body 300 as illustrated in FIGS. 19–20.

Figure 22:
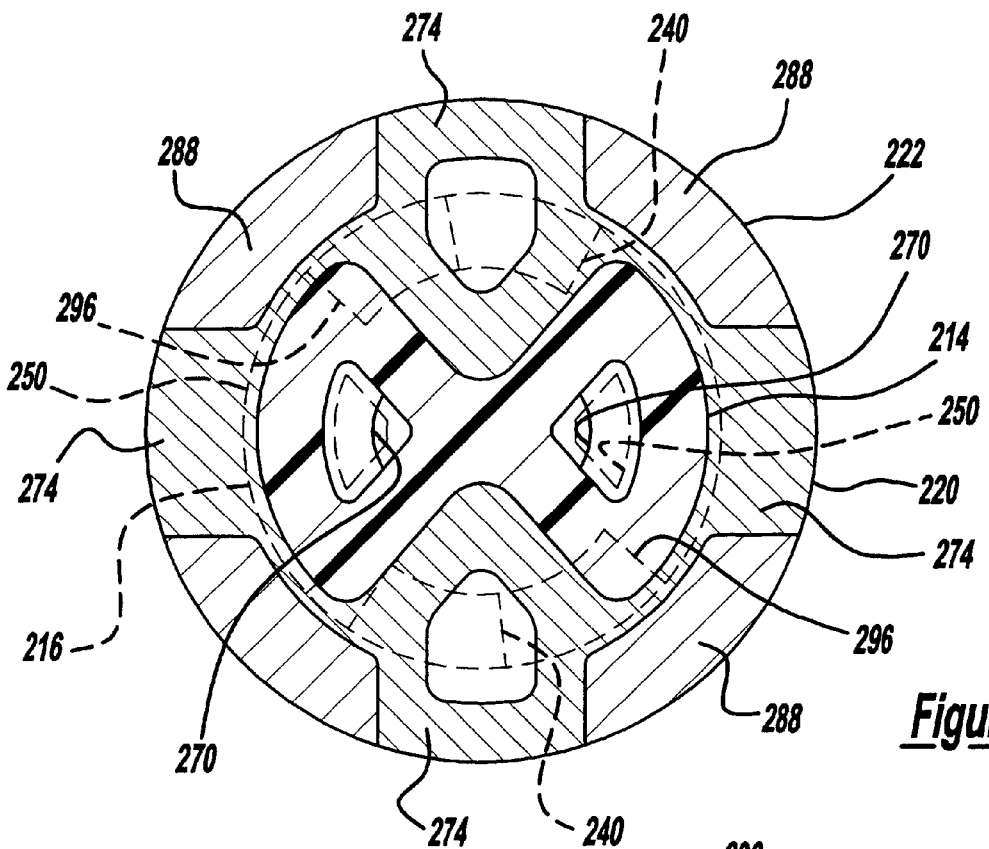
FIG. 22 is a section view taken along line 22—22 of FIG. 21 with a valve disk (shown in phantom) illustrated in the open valve position.

According to one aspect of the invention, the same valve can be made to operate in a clockwise or counterclockwise direction to open the valve without using adapters or any other additional parts. As illustrated in FIG. 22, the legs 288 of the bonnet 222 engage the insert 220 between the projections 274 and the valve disk 216, illustrated in phantom, is aligned with the second valve disk 214. In the illustrated configuration, the valve is in the open position, with the valve disk openings 250 aligned with the insert inlet 270. The valve disk 216 is fixed relative to the valve stem 212 and the stem 212 is limited to rotation through an arc of 90° due to the interaction of the valve stem stops 240 (shown in phantom) and the bonnet stops 296 (shown in phantom).

Figure 23:
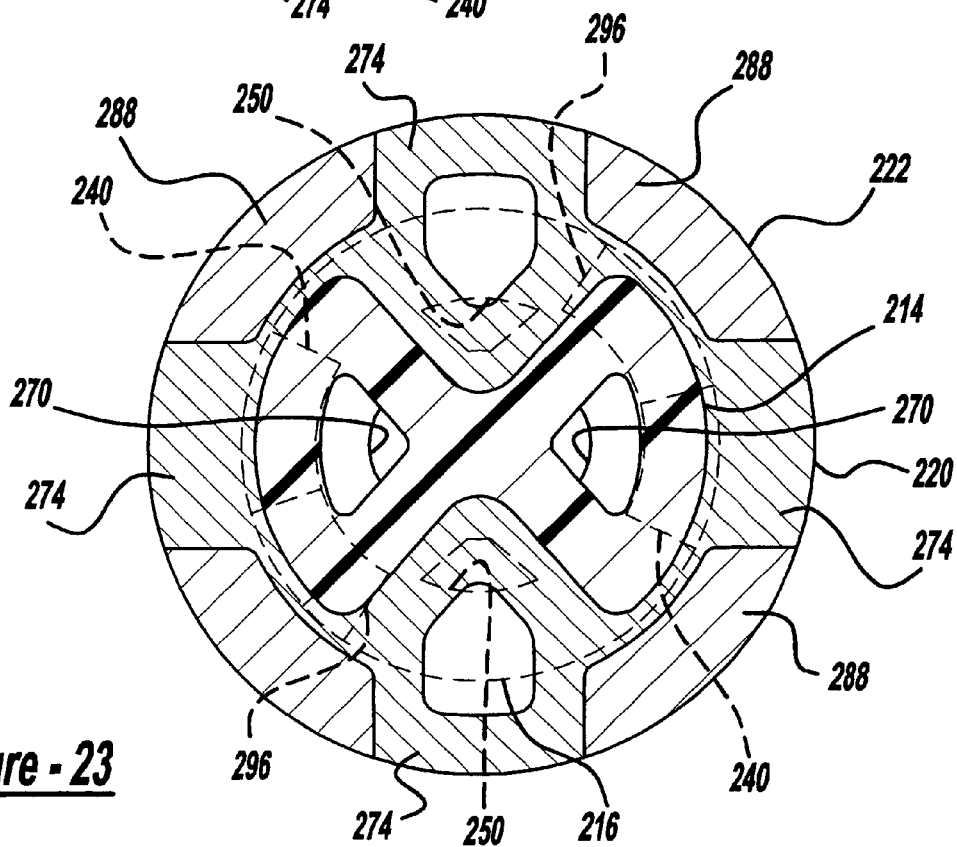
FIG. 23 is a section similar of FIG. 22 with the valve disk shown in the closed valve position.

In FIG. 22, the valve is open and the valve stem 212 can only move 90° clockwise to the closed position. To change the direction of operation, the bonnet/valve stem sub-assembly is disengaged from the insert, rotated 90° and reengaged with the insert, as illustrated in FIG. 23. As illustrated, the valve disk openings 250 are no longer aligned with the insert inlet 270 and the valve is closed. At the same time, the stem 212 is still limited to 90° of clockwise rotation, but in the configuration illustrated in FIG. 23, the clockwise rotation opens the valve. Thus, moving the bonnet/valve stem sub-assembly 90° relative to the insert changed the direction of operation of the valve.

Figure 18:
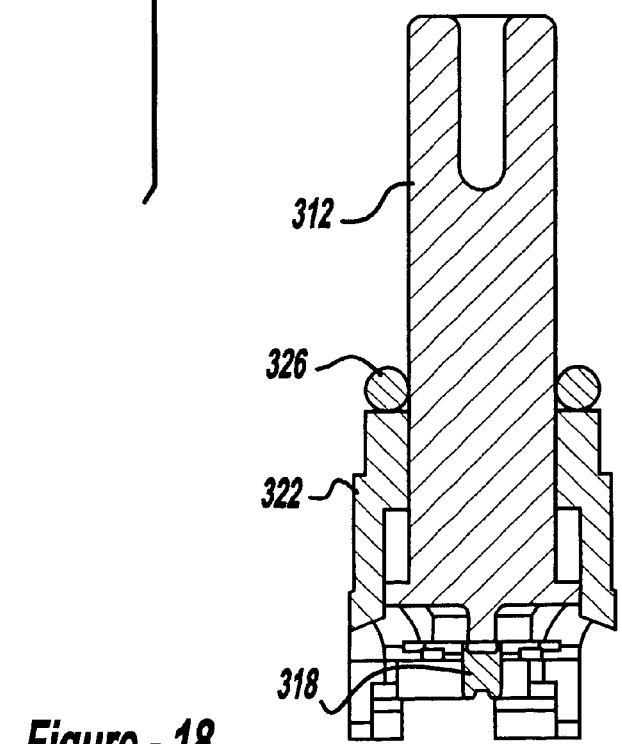
FIG. 18 is a section view taken through the valve assembly of FIG. 17.

Although the above discussion regarding changing the operational direction was made with reference to a valve insert such as illustrated in FIGS. 1 and 15, it will be appreciated that the same functionality can be achieved using the described bonnet with the integral insert such as that illustrated in FIGS. 18–19. Moreover, while the described embodiment of the invention uses cooperating stops on the bonnet and valve stem, cooperating stops formed on other parts of the valve assembly can also be used. Furthermore, the same functionality can be achieved by rotating the seal insert relative to the end body and limiting the bonnet/valve stem sub-assembly to a single configuration with respect to the end body.

Figure 24:
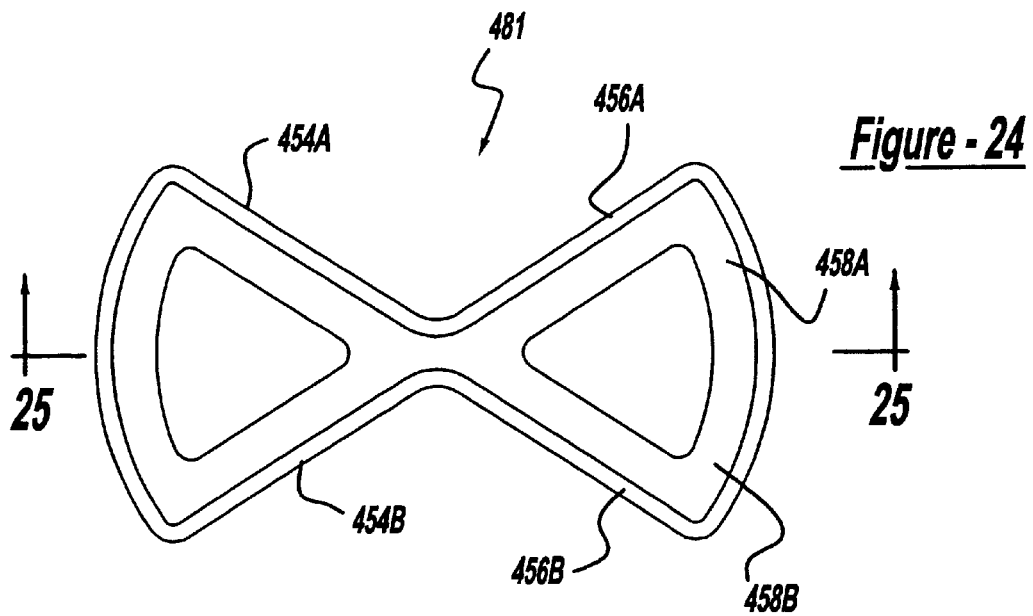
FIG. 24 is a bottom view of an alternative embodiment of the bow-tie seal.
Figure 25:
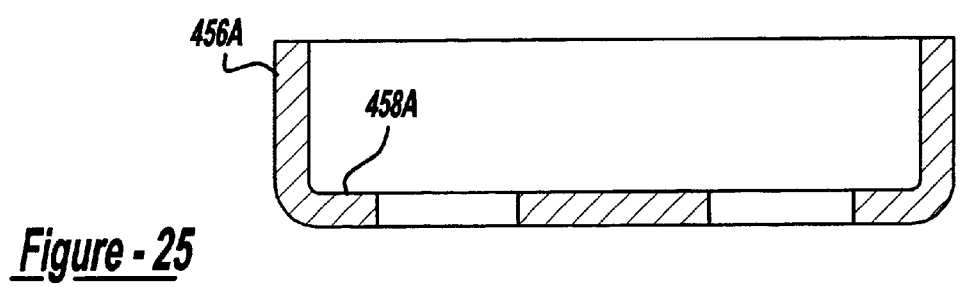
FIG. 25 is a section view taken along line 25—25 in FIG. 23.

A presently preferred alternative embodiment of the bow tie seal is illustrated in FIGS. 24–25. The seal 481 includes a pair of generally W-shaped walls 454A, 454B that are joined together to form a bow-tie shape substantially the same as that of the seal 18. Each wall 454A, 454B includes a vertical member 456A, 456B and a horizontal member 458A, 458B. The horizontal members 458A, 458B are operatively disposed adjacent a sealing disk (not shown) and the vertical members 456A, 456B are operatively disposed adjacent the sidewalls of a seal insert (not shown). When installed in the valve assembly of FIG. 21, the section view taken along line 22–22 of FIG. 21 would look identical to FIG. 22. However, one advantage of the seal 481 over the seal 18 is that water pressure assists in maintaining sealing contact between the seal 481 and the sealing disk and seal insert sidewall.

A valve assembly has been described with respect to several presently preferred embodiments. However, it will be understood that various modifications can be made within the scope of the invention as claimed below.

What is claimed is:

1. A valve assembly comprising:
   a valve stem;
   an annular bonnet configured to receive the valve stem;
   a valve disk coupled to one end of the valve stem;
   a bow-tie shaped seal disposed adjacent the valve disk and having a top surface and a bottom surface; and
   an insert having a bow-tie shaped recess configured to receive the seal.

2. The valve assembly of claim 1 wherein the seal defines a first pair of orifices for the passage of fluid therethrough.

3. The valve assembly of claim 2 wherein the top surface includes a fist pair of sealing ridges extending therefrom and the bottom surface includes a second pair of sealing ridges extending therefrom.

4. The valve assembly of claim 2 further including a second valve disk wherein the seal provides a sealing function and a biasing function.

5. The valve assembly of claim 2 wherein the insert includes a second pair of orifices, the fist pair of orifices aligning with the second pair of orifices for the passage of fluid therethrough.

6. The valve assembly of claim 5 wherein the valve disk includes a third pair of orifices, the third pair of orifices being aligned with the first and second pairs of orifices when the valve assembly is in an open condition for the passage of fluid therethrough, the third pair of orifices being non-aligned with the first and second pairs of orifices when the valve assembly is in a closed condition to prevent the passage of fluid therethrough.

7. The valve assembly of claim 1 further including an end body having an inlet and an outlet, the valve insert being disposed in the end body between the inlet and the outlet.

8. The valve assembly of claim 7 wherein the valve insert is integrally formed with the end body.

9. A valve assembly comprising:
   a valve stem;
   a resilient seal having a first pair of orifices;
   a first valve disk coupled to one end of the valve stem and disposed adjacent the seal, the first valve disk including a second pair of orifices; and
   an insert having a recess configured to receive the seal and including a third pair of seals, the first, second and third pairs of orifices cooperating with each other to allow the passage of fluid through the valve assembly.

10. The valve assembly of claim 9 wherein the resilient seal includes a plurality of sidewalls that cooperate to define a bow tie shape.

11. The valve assembly of claim 10 wherein each of the plurality of sidewalls includes a top surface and a bottom surface and a pair of sealing ridges extending upwardly from the top surface and a pair of sealing ridges extending downwardly from the bottom surface.

12. The valve assembly of claim 10 wherein the insert includes a bow tie shaped recess for receiving the seal, the recess including the third pair of orifices.

13. The valve assembly of claim 9 further including an end body, the insert being integrally molded with the end body.

14. The valve assembly of claim 9 further including a second valve disk disposed adjacent the first valve disk, wherein the insert includes a recess for receiving the seal and the second valve disk, the seal providing a biasing function to retain the first and second valve disks in contact with each other and a sealing function between the second valve disk and the insert.

15. The valve assembly of claim 9 further including an end body having an inlet and an outlet, the insert being disposed in the end body between the inlet and the outlet.

16. The valve assembly of claim 15 wherein the insert is integrally molded with the end body.

17. The valve assembly of claim 9 further including a bonnet and a valve stem disposed therein, wherein the bonnet includes a first plurality of stops and the valve stem includes a second plurality of stops, the first plurality of stops cooperating with the second plurality of stops to limit the amount of rotational movement of the valve stem relative to the bonnet.

18. The valve assembly of claim 9 wherein the insert includes a plurality of projections and the valve stem includes a bonnet having a plurality of legs, the plurality of legs engaging the plurality of projections to retain the bonnet in a first position relative to the insert.

19. The valve assembly of claim 18 wherein the bonnet is moveable from the first position to a second position, the valve stem being moveable in a clockwise direction to open the valve assembly and a counterclockwise direction to close the valve assembly when in the bonnet is in first position, the valve stem being movable in a counterclockwise direction to open the valve assembly and a clockwise direction to close the valve assembly when the bonnet is in the second position.

20. A valve assembly comprising:
   a bonnet having a valve stem disposed for rotation therein; and an insert disposed in an end body wherein the insert includes a plurality of projections and the bonnet includes a plurality of legs, the plurality of legs engaging the plurality of projections to retain the bonnet in one of a first position and a second position relative to the insert, the valve stem being rotatable in a clockwise direction to open the valve assembly and a counterclockwise direction to close the valve assembly when in the bonnet is in first position, the valve stem being rotatable in a counterclockwise direction to open the valve assembly and a clockwise direction to close the valve assembly when the bonnet is in the second position.

21. A method of changing the opening movement of a valve assembly between a clockwise movement and a counterclockwise movement, the method comprising:

providing a seal insert;

providing a valve sub-assembly, the valve assembly being disposed in a first position relative to the seal insert; and rotating the valve sub-assembly relative to the seal insert to a second position.

22. The method of claim 21 wherein the valve sub-assembly includes a bonnet and a valve stem disposed in the bonnet, the bonnet including a first plurality of stops and the valve stem including a second plurality of stops, the first plurality of stops cooperating with the second plurality of stops to limit the rotational movement of the valve stem relative to the bonnet.

23. The method of claim 21 wherein the bonnet includes a plurality of legs and the seal insert includes a plurality of projections, the plurality of legs engaging the plurality of projections.

24. The method of claim 21 wherein the valve sub-assembly is rotated 90° relative to the seal insert from the first portion to the second position.

25. A valve assembly comprising:

a valve stem;

a valve disk coupled to the valve stem; and a bow-tie shaped seal operatively disposed adjacent the valve disk and cooperating therewith to control the flow of water through the valve assembly.

26. The valve assembly of claim 25 wherein the seal includes a pair of W-shaped sidewalls joined together to define the bow tie shape.

27. The valve assembly of claim 26 wherein each of the plurality of sidewalls includes a horizontal member and a vertical member, the horizontal members being operatively disposed adjacent the valve disk.

28. The valve assembly of claim 26 further including an insert wherein the insert includes a bow tie shaped recess for receiving the seal.

29. A method of changing the opening movement of a valve assembly between a clockwise movement and a counterclockwise movement, the method comprising:

providing a first valve member, wherein the first valve member includes one of a bonnet, a seal insert and an end body;

providing a second valve member disposed in a first position relative to the first valve member, wherein the second valve member includes one of the bonnet, the seal insert and the end body; and rotating the second valve member relative to the first valve member to a second position.

30. A method of changing the opening movement of a valve assembly between a clockwise movement and a counterclockwise movement, the method comprising:

providing a first valve member, wherein the first valve member includes one of a valve stem, a seal insert and an end body;

providing a second valve member disposed in a first position relative to the first valve member, wherein the second valve member includes one of the valve stem, the seal insert and the end body; and rotating the second valve member relative to the first valve member to a second position.

31. A valve assembly comprising:

a valve disk;

a seal; and means for changing the direction of operation of the valve assembly, wherein the means for changing includes a first valve member and a second valve member, the first valve member being disposed in a first position relative to a second valve member for opening operation in a first direction and in a second position relative to the second valve member for opening operation in a second direction.

32. The valve assembly of claim 31 wherein the first valve member includes one of a bonnet, a seal insert, and an end body and the second valve member includes another of the bonnet, the seal insert and the end body.

33. The valve assembly of claim 32 wherein the first valve member includes one of a valve stem, a seal insert, and an end body and the second valve member includes another of the valve stem, the seal insert and the end body.

34. The valve assembly of claim 33 wherein the first valve member includes one of a valve stem, a seal insert, and an end body and the second valve member includes another of the valve stem, the seal insert and the end body.

35. The valve assembly of claim 2 wherein the bow-tie shaped seal includes a vertical member and a horizontal member, the horizontal member sealingly engaging the disk in response to water pressure against the vertical member and the horizontal member.

36. The valve assembly of claim 25 wherein the bow-tie shaped seal includes a vertical member and a horizontal member, the horizontal member sealingly engaging the disk in response to water pressure against the vertical member and the horizontal member.

* * * * *